United States Patent [19]
Noyes

[11] Patent Number: 5,344,563
[45] Date of Patent: Sep. 6, 1994

[54] WASTEWATER TREATMENT SYSTEM

[76] Inventor: Daniel G. Noyes, P.O. Box 800277, Houston, Tex. 77280

[21] Appl. No.: 68,206

[22] Filed: Jun. 1, 1993

[51] Int. Cl.⁵ ............................................. C02F 3/22
[52] U.S. Cl. .................................... 210/621; 210/624; 210/626; 210/629; 210/195.1; 210/195.3; 210/220
[58] Field of Search ............... 210/607, 620, 621, 622, 210/624, 626, 629, 195.1, 195.3, 202, 220, 258, 259, 194, 512

[56] References Cited

U.S. PATENT DOCUMENTS

| | | | |
|---|---|---|---|
| 3,897,000 | 7/1975 | Mandt | 210/629 |
| 4,166,790 | 9/1979 | Zlokurnik et al. | 210/629 |
| 4,189,384 | 2/1980 | Fontein et al. | 210/629 |
| 4,440,645 | 4/1984 | Kite | 210/621 |
| 4,690,764 | 9/1987 | Okumura et al. | 210/220 |
| 5,198,105 | 3/1993 | Kanting et al. | 210/620 |

*Primary Examiner*—Christopher Upton
*Attorney, Agent, or Firm*—Kenneth A. Keeling

[57] ABSTRACT

A wastewater treatment system and method is disclosed, including a circular aeration basin and a contiguous annular clarifier channel. Rotational flow of an aerated mixture of untreated wastewater and return sludge is induced in the aeration basin at its periphery with relatively less turbulent flow at the center.

A clarifier inlet is fluidly connected to the aeration basin through openings provided in the aeration basin wall, the clarifier inlet including means to dissipate turbulence.

A sludge removal manifold extends within the clarifier having valve-controlled suction arms. The spaced suction arms provide for precise control of sludge blanket depth and sludge age independent of rate of sludge return to the basin.

Process sludge withdrawn from the clarifier is mixed with raw wastewater and returned to the aeration basin.

The relatively less-turbulent flow in the central area of the basin allows process sludge to accumulate in said central area. A drain provided centrally in the aeration basin allows for draw-off of such digested sludge.

24 Claims, 3 Drawing Sheets

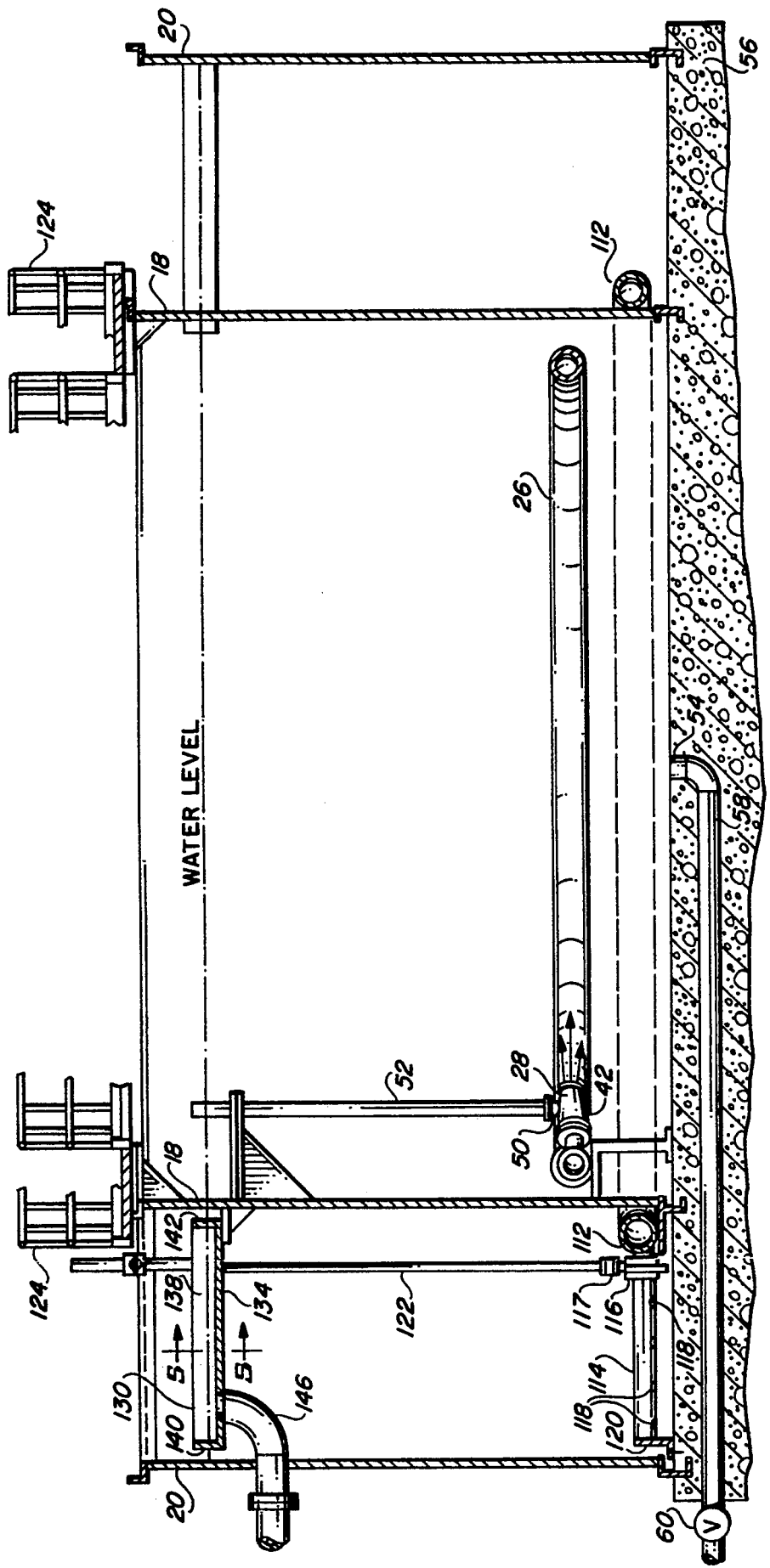

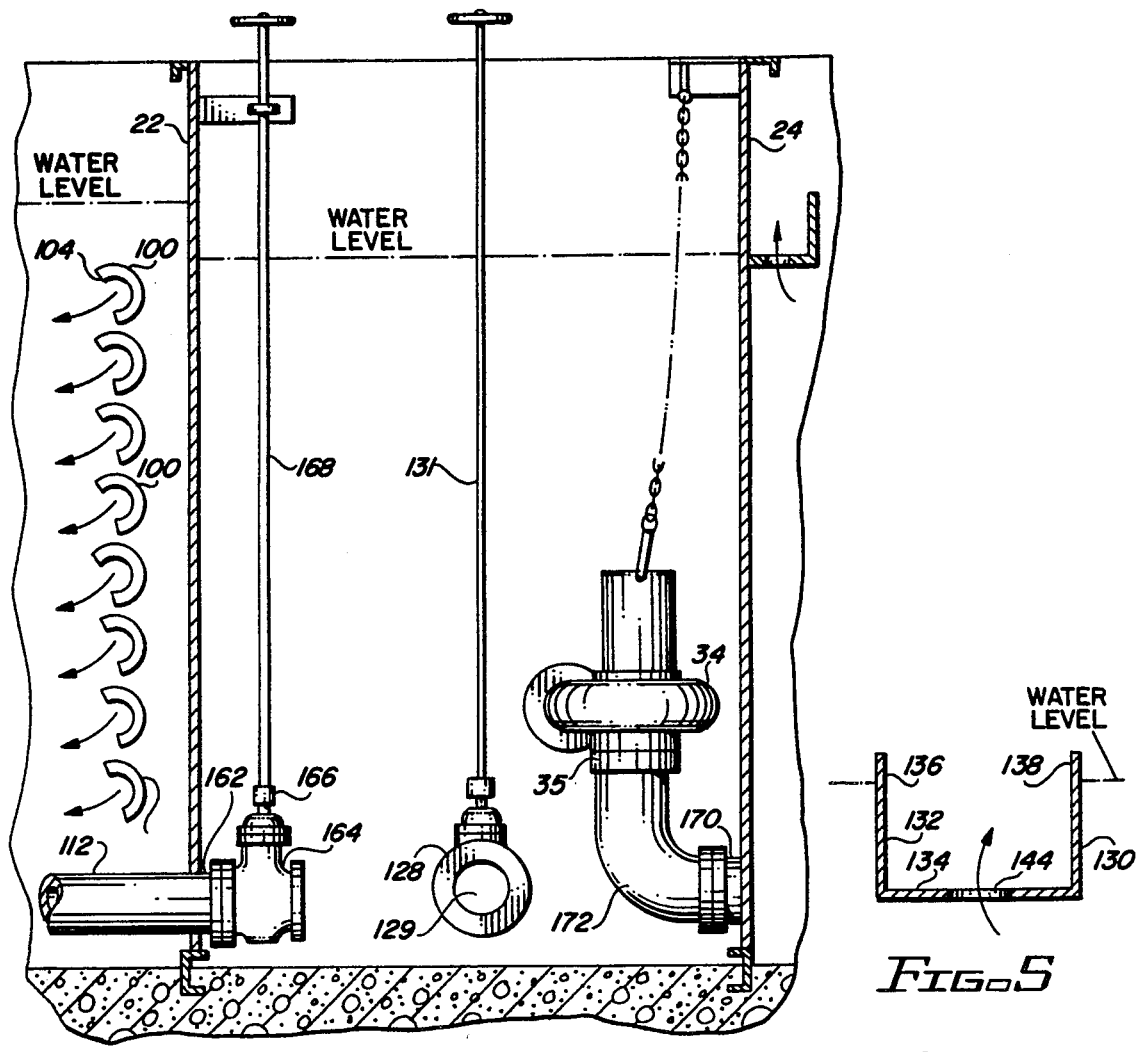
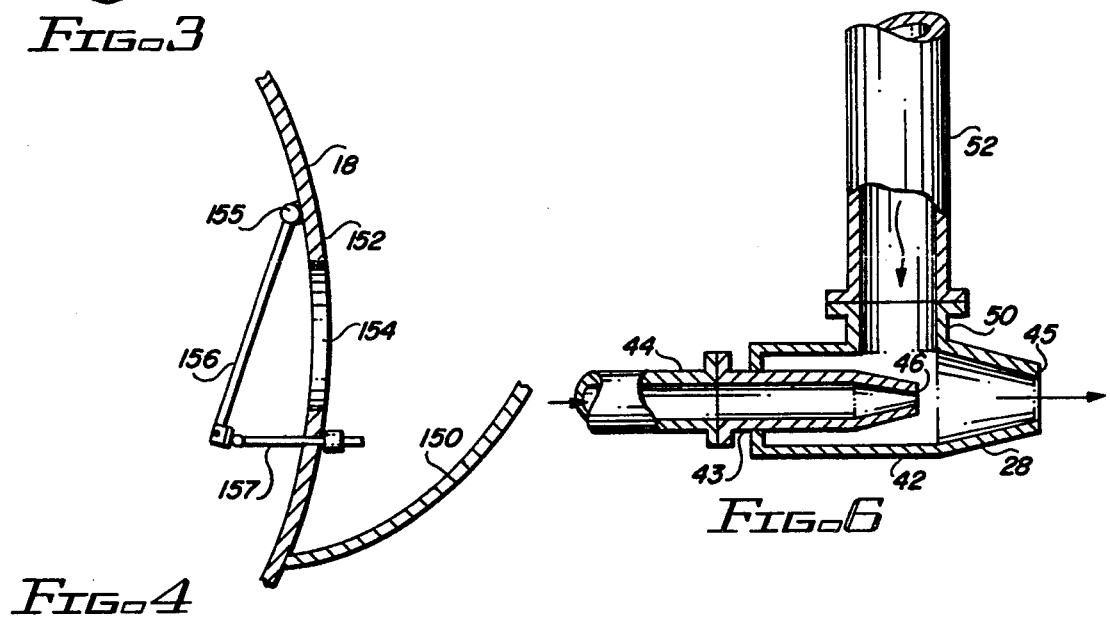

WASTEWATER TREATMENT SYSTEM

FIELD OF THE INVENTION

This invention relates generally to the treatment of non-toxic wastewater, including water-borne waste material from residential, commercial and other sources, and particularly to an improved system for activated sludge waste-water treatment.

BACKGROUND OF THE INVENTION

Wastewater treated by wastewater treatment systems contain soluble, partially soluble and insoluble in and contaminates. materials may be decomposable, partially decomposable or not decomposable. Decomposable and partially decomposable materials are referred to as biodegradable, that is, the material may be biologically broken down or stabilized by bacterial action. Wastewater treatment systems are designed to provide controlled decomposition of wastes to reduce pollution, health hazards and offensive odors.

Decomposable material is stabilized in wastewater treatment systems by bacteria, protozoa, and other microorganisms. Bacterial consumption of material, creating energy and reproducing bacterial cells, is the foundation of activated sludge wastewater treatment.

Conventional wastewater treatment systems may include pretreatment, primary treatment, secondary treatment, and advanced treatment.

Pretreatment includes screening, comminuting (mechanical cleaning of screens by shredding solids to a size which can pass through screen openings), degritting, and grease and scum removal.

Primary treatment includes removal of suspended solids from wastewater by clarification and skimming, typically involving a tank or channel, reducing flow velocity, settling of heavier solids and skimming of relatively light solids. Primary treatment may include anaerobic digestion processes, aerobic digestion processes, or a combination thereof. Primary treatment systems typically include sludge collection mechanisms, sludge suction devices, grit removal devices, and sludge dewatering devices to reduce the volume of sludge to be disposed.

Secondary treatment systems are typically aerobic systems including an aeration phase and a clarification phase. Secondary treatment systems may follow primary treatment, or in some applications, be utilized in lieu of primary treatment systems. Secondary treatment systems typically include an aeration basin, an air distribution system, a clarifier, sludge collection mechanisms, and sludge removing devices.

Advanced treatment includes further removal of suspended and dissolved organic solids by means including filtration, removal of pathogens and chloroforms by oxidation, chlorination or heating, precipitation of minerals, adsorption or other methods.

In the activated sludge process of primary or secondary treatment, microorganisms are contained in an activated sludge and mixed with incoming wastewater; the wastewater providing food for the microorganisms. Such mixing is accomplished in an aeration tank or channel. In the aerobic activated sludge process, oxygen is intimately mixed with the activated sludge and the wastewater, the microorganisms converting suspended organic solids into energy, carbon dioxide, water, and additional microorganism cells. The aerobic activated sludge process therefore includes (i) mixing of wastewater, activated sludge, and oxygen in an aeration tank, (ii) conversion of suspended organic solids, (iii) settling of activated sludge in the clarifier, (iv) returning the activated sludge to the aeration tank for further treatment (v) removing purified liquor from the clarifier, and (vi) removal and disposal of the final, inert sludge.

Current technology used in the design of activated sludge wastewater treatment plants provides a high amount of process control and consistent treatment of wastewater for municipal and industrial applications. The conventional design of such plants, however, requires the use of a large number of mechanical subsystems including pumps, blowers, gears, chains, and associated mechanical elements. The large quantity of mechanical parts makes such conventional systems expensive to construct and maintain as well as difficult to operate.

The disadvantages of conventional designs using a large number of mechanical subsystems are particularly difficult for smaller communities which cannot afford the capital outlay for an activated sludge treatment plant and would have difficulty in reliably maintaining the mechanical performance and/or recruiting qualified maintenance personnel, resulting in inefficiently operated plants producing poor quality effluent.

Baldespino U.S. Pat. No. 3,220,706 discloses a sewage treatment system comprising in combination an aeration unit including a generally circular tank, a tangentially disposed adjustably-sized sewage inlet located along the wall of the tank, an overflow discharge line, a circulating pump, vertically adjustable air inlet means requiring blowers or compressors in the middle of said tank spaced from the bottom of said tank, blowers and a liquid spray ring around the upper interior portion of the tank having downwardly-directed orifices. Sewage introduced into the tank through tangential pump discharge inlets is caused to rotate. Compressed air from the air inlet means induces movement in the sewage vertically at right angles to the first rotation thereby resulting in rolling, swirling, action of the sewage with intimate exposure of the sewage with the oxygen in the air. The aeration tank includes an inclined tank bottom, the tank bottom inclined upwardly and outwardly from the center with a sump at the lower level. Through tangential flow of the sewage introduced, and vertical flow induced by the aeration ring, the Baldespino disclosure seeks to obtain rolling turbulent flow within the aeration unit. Grit, such as sand, free from solid constituents, is accumulated at the center of the tank (Column 6, lines 7-16, Column 3, lines 1-3). The Baldespino disclosure includes a sump, an aeration tank, a settling tank, a sludge digestion tank, and various valves, blowers, and pumps connecting the various tanks.

Hell, et al. U.S. Pat. No. 4,629,565 discloses a method for purifying wastewater in a settling plant wherein the final settling tank is arranged inside a scavenger basin. The aeration of waste is separated from the aeration of the return sludge, the waste and sludge flows being mixed before entering the scavenging basin.

Mandt U.S. Pat. No. 4,596,658 describes a system for removing clarified wastewater in a sequential batch-type plant including a subsurface decanter manifold extending horizontally along the discharge wall of the batch plant tank, the decanter manifold including angled, parallel and overlapping members limiting flow into the decanter manifold through a horizontally extended orifice defined by said overlapping members.

Schneider et al. U.S. Pat. No. 4,452,700 describes a process for the performance and control of chemical or biochemical process cycles in two or more reaction basins, the basins arranged concentrically to one another, the basins having connection between one another through which fluid passes. The contents of the basins are caused to assume a horizontal rotational flow, such rotational flow induced by propellers. Connections between the basins may be in the form of weirs, flaps, deflectors, wall openings, or other passage openings arranged in the container wall of the inner basin. The Schneider disclosure includes gassing using an auxiliary aerator in the first stage and in the second stage with recirculation of the fluid between the first stage and the second stage.

Reed U.S. Pat. No. 4,443,338 discloses a method for converting a reactor basin utilizing an activated sludge process from a plug flow or complete mix configuration to an oxidation ditch configuration, the method including forming an endless channel within the basin, placing a barriered circulator/aerator within the endless channel, said circulator/aerator comprising a barrier means, flow passage means, pump means, and aeration means for dispersing an oxygen containing gas into the liquor stream and selectively and independently operating the pump means and aeration means.

As indicated by the foregoing references and the references cited therein, the current technology includes a wide array of wastewater treatment subsystems and combinations thereof. As the references indicate, wastewater treatment subsystems typically include numerous mechanical, electrical, and hydraulic components.

It is an object of the present invention to provide a wastewater treatment system wherein efficiency of mechanical systems and energy is accomplished by improved utilization of hydraulic characteristics and physical properties of particulate motion and settling, the process relying on a single pumping unit to induce all liquid and oxygen flow through the aeration and clarification processes thereby minimizing the reliance on mechanical components and subsystems.

It is a further object of the present invention to provide a wastewater treatment system having minimal control variables wherein process control requires minimal operator input.

It is a further object of the present invention to provide an efficient wastewater treatment system wherein activated sludge age may be varied to optimize metabolic process independent of plant throughput.

It is a further object of the present invention to provide a wastewater treatment system which minimizes the number of mechanical components in the system.

It is a further object of the present invention to provide an efficient wastewater treatment system wherein the rate of wasting (thickening and aging) may be varied independent of plant throughput.

It is a further object of the present invention to provide a relatively efficient wastewater treatment system.

It is further object of the present invention to provide a wastewater treatment system providing relatively large capacity for wastewater treatment in a relatively small area.

The foregoing and other objects are accomplished by a wastewater treatment system that includes a circular aeration basin and an annularly extending clarifier channel. Circular flow of a mixture of untreated wastewater and return sludge is induced into the aeration basin by tangentially mounted Venturi aerators. The aerators are spaced along the circumference of the basin and fed through a common manifold, which manifold is located within the basin. The hydraulic circulation within the aeration basin establishes a vortex within the basin, the flow being generally whirlpool-like. Such flow provides a controlled, relatively less turbulent area at the central axis of the basin.

The Venturi aerators include nozzles attached to the common manifold and supplied with environmental air. The liquid velocity through the Venturi nozzles creates fine bubble dispersion of air within the mixed liquid, creating efficient oxygen transfer to the mixed liquid and avoiding clogging problems often associated with conventional systems.

The clarifier comprises an annular chamber contiguous with the outside wall of the aeration basin. The clarifier inlet is hydraulically connected to the aeration basin through openings provided in the aeration basin wall; the clarifier inlet includes means to dissipate turbulence.

Surface skimmers are provided in spaced relationship around the clarifier, such skimmers being hydraulically connected to the aeration basin for skimming and returning surface scum to the aeration basin.

A sludge removal manifold extends within the clarifier with radially-spaced, valve-controlled suction arms. The spaced suction arms provide for precise control of sludge blanket depth and sludge age independent of sludge return rate.

Process sludge withdrawn through the suction arms is mixed with raw wastewater and returned to the aeration basin.

Clarified fluid is withdrawn from the annular clarifier channel through a trough and orifices provided at the end of the clarifier channel.

The circular flow within the aeration basin and the relatively less-turbulent flow in the central area of the basin allows process sludge to accumulate in said central area. Such sludge may be maintained for relatively long periods of time to allow reduction of remaining volatiles. A drain provided centrally in the aeration basin allows for draw-off of such digested sludge utilizing the hydraulic head differential in the tank, draw-off being accomplished by valve control piping connected to the drain.

BRIEF DESCRIPTION OF THE DRAWINGS

FIG. 2 depicts a cross-sectional elevation of the wastewater treatment system including a cross-walk omitted from FIG. 1.

FIG. 3 depicts a detailed view of the mixing chamber and a portion of the clarifier of the present invention.

FIG. 4 depicts a detailed view of a scum removal baffle and scum port.

FIG. 5 depicts a detailed view of a submerged discharge orifice weir.

FIG. 6 depicts a detailed view of the mixing chamber.

DESCRIPTION OF THE PREFERRED EMBODIMENT

Figure 1:
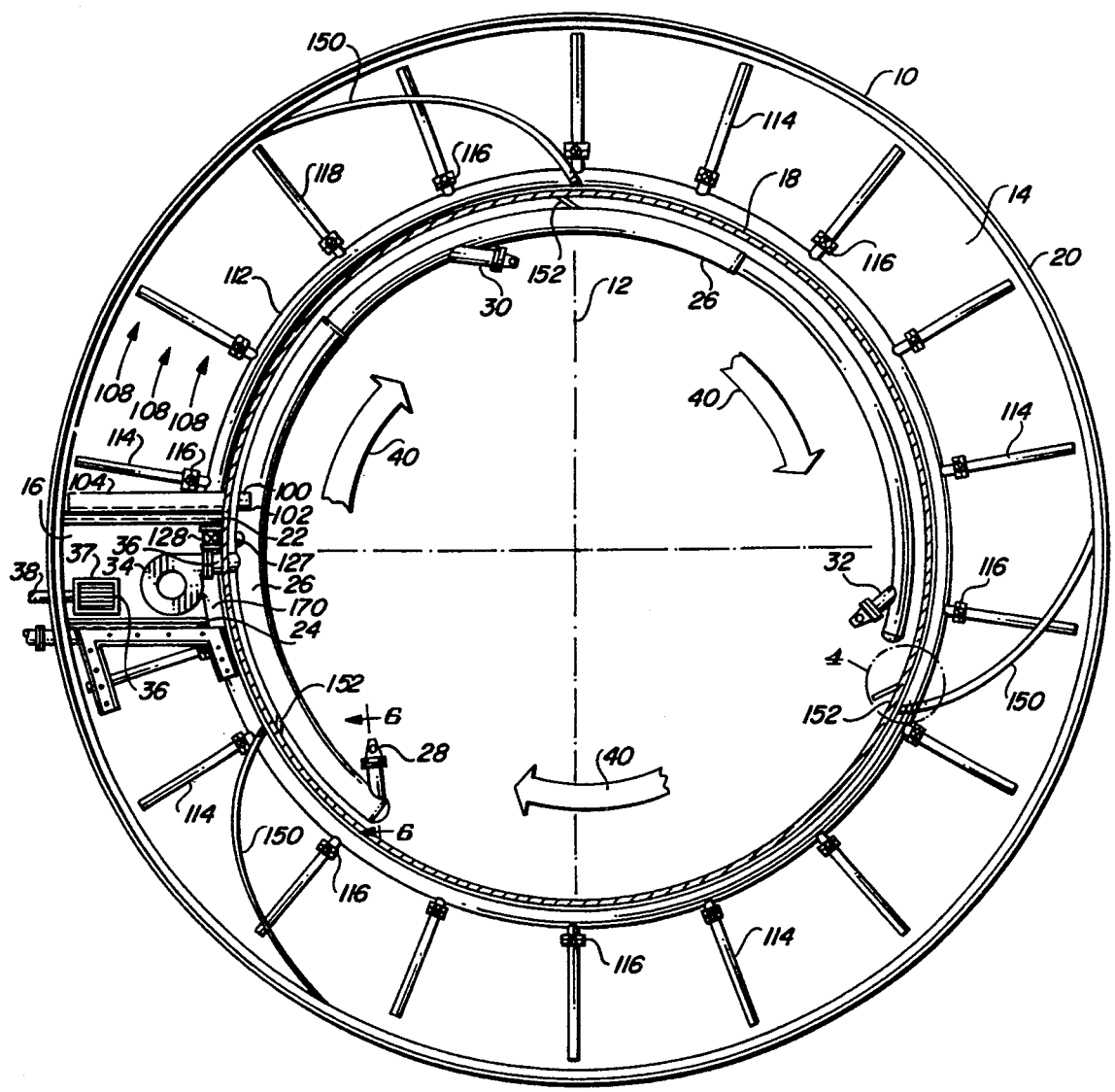
FIG. 1 depicts a schematic plan view of an aeration basin and clarifier of the wastewater treatment system of the present invention.

Referring first to FIG. 1, a plan view of the wastewater treatment system 10 of the present invention is depicted. The wastewater treatment system 10 generally includes a circular aeration basin 12, a clarifier 14 comprising a channel extending circumferentially around the aeration basin 12 and a mixing chamber 16.

The aeration basin 12 is defined by partition 18, said partition 18 comprising a circular wall separating aeration basin 12 from clarifier 14. Circular outer wall 20 defines the outer extent of clarifier 14, said outer wall 20 extending circumferentially around and spaced from partition 18. Outer wall 20 and partition 18 are supported on foundation 56 (FIG. 2).

Clarifier first end wall 22 extends from partition 18 to outer wall 20. Clarifier second end wall 24, spaced from first end wall 22, additionally extends from partition 18 to outer wall 20. Partition wall 18, first end wall 22, outer wall 20 and second end wall 24 define mixing chamber 16 within the annular space between outer wall 20 and partition wall 18.

Generally, the processes accomplished in aeration basin 12 include turbulent mixing of raw wastewater, recirculated sludge and oxygen, microbial growth and corresponding decomposition of matter contained in the wastewater, and accumulation of inert suspended organic solids after decomposition. Generally, the processes accomplished in the clarifier 14 are reduction of turbulence, settling of suspended organic solids, recirculating settled organic solids to the aeration basin 12 and removal of clarified liquid.

Wastewater inlet pipe 38 is provided for introducing wastewater to be treated into mixing chamber 16 of the wastewater treatment system 10. Inlet box 37 and bar screen 36 are provided to remove large objects from the wastewater to be treated prior to introduction into mixing chamber 16, inlet box 37 comprising a walled structure receiving inlet pipe 38 and having bar screen 36 disposed below the open end of pipe 38.

The wastewater to be treated is dispersed in mixing chamber 16, mixing chamber 16 additionally containing activated sludge, as described hereinafter.

Inlet pump 34 is disposed in mixing chamber 16, the discharge of inlet pump 34 being connected by connecting pipe 36 to mixed liquor manifold 26. Mixed liquor manifold 26 comprises a curved pipe extending around a portion of the periphery of aeration basin 12. Manifold 26 is spaced from partition 18 and from foundation 56.

In the preferred embodiment depicted, aerator 28, aerator 30, and aerator 32 are evenly spaced around mixed liquor manifold 26. As illustrated in FIG. 1, aerator 28, aerator 30, and aerator 32 are each disposed at inwardly extending angles to the partition 18 and are each disposed such that their respective outlets project in the same radial direction and project slightly inwardly from the partition 18.

Referring to FIG. 2 and FIG. 6, details of construction and location of aerator 28 are depicted. Aerator 28 comprises a generally cylindrical aerator outer body 42 and a generally cylindrical inner body 43 connected at one end to connecting pipe 44, which connecting pipe 44 provides fluid connection between mixed liquor manifold 26 and inner body 43. A reduced area nozzle 46 is provided at an end of inner body 43 distal to the end connected to connecting pipe 44 and interior of outer body 42. A reduced area nozzle 45 is provided at the end of outer body 42 distal from connecting pipe 44. An air inlet 50 is provided in the wall of outer body 42. Standpipe 52 is connected to the air inlet 50. As indicated in FIG. 2, stand pipe 52 extends above the surface of the liquor contained in aeration basin 12 providing fluid connection of environmental air with the interior of outer body 42.

Regulated head pressure of mixed liquor in manifold 26 propels liquor through nozzle 46 at a relatively high velocity. The relatively high velocity of flow of mixed liquor through nozzle 46 into the interior of outer body 42 creates a relatively low pressure area exterior of nozzle 46. The pressure differential (Bernoulli effect) draws environmental air into the interior of outer body 42, where the air is turbulently and intimately mixed with the mixed liquor. The mixture of air and liquid is propelled though nozzle 45 into aeration basin 12. The relatively high velocity of the mixed liquor and the introduction of the air interior of outer body 42 creates turbulent flow at the outlet of aerator 28, resulting in a fine bubble dispersion and efficient oxygen transfer without clogging problems normally associated with high efficiency systems. Aerator 30 and aerator 32 are each constructed in like manner to aerator 28. The mixed liquor and air discharged through aerators 28, 30 and 32 enter the aeration basin 12 creating a rotational flow indicated by arrows 40 in FIG. 1. Such induced flow creates a vortex within the circular aeration basin 12, such vortex having a relatively high rate of rotational flow at or near the discharge of the aerators 28, 30, and 32 and a relatively low rate of flow at the center of the aeration basin 12. Air bubbles introduced into the mixed liquor at aerators 28, 30 and 32 may be carried by the circulation pattern of the mixed liquor downward by appropriate downward orientation of aerators 28, 30 and 32, increasing residency time of such air bubbles in the mixed liquor.

As previously noted, the flow in the aeration basin 12 is relatively faster at the areas indicated by arrows 40 and relatively slower at the center of the aeration basin 12. Heavier suspended organic solids therefore accumulate at the center of the aeration basin 12. The accumulated suspended organic solids form a substantially inert sludge to be removed from the wastewater system 10. Referring to FIG. 2, removal is accomplished through a drain 54 provided in foundation 56 of aeration basin 12. Drain 54 is fluidly connected to pipe 58, which pipe 58 extends to sludge dewatering means (not shown). The drain pipe 58 is sized to allow for sufficient residency time to allow any remaining volatile s to be rendered inert. The sludge dewatering means comprise conventional technology. Valve 60 is provided in pipe 58 exterior of foundation 56 said valve 60 controlling flow of sludge through said pipe 58.

Referring to FIGS. 1 and 3, clarifier inlet pipes 100 are provided for fluid communication between aeration basin 12 and clarifier 14. Clarifier inlet pipes 100 comprise a series of aligned, stacked pipes located in clarifier 14. A typical inlet pipe 100 includes a first open end 102 extending into the interior of aeration basin 12, the body of the inlet pipe 100, its second distal end 104 contained in the clarifier 14. Each inlet pipe 101 is provided with a slot 106 extending between partition 18 and pipe end 104.

Flow into the clarifier inlet pipes 100 is induced by the relatively higher liquor head pressure in aeration basin 12 compared to the liquor head pressure in clarifier 14. The relatively turbulent flow in the perimeter of aeration basin 12 is isolated in inlet pipes 100.

Slots 106 are provided in the segments of inlet pipes 100 extending into clarifier 14. Slots 106 and open ends 104 of inlet pipes 100 allow flow therefrom to be relatively smooth. The plurality of inlet pipes 100 provide for laminar flow. Slots 106 in clarifier inlet pipes 100 provide an even distribution of flow from each of inlet pipes 100 into clarifier 14. The clarifier inlet pipes 100 are thereby constructed to effectively dissipate turbulence in the liquid. As liquor enters the clarifier, energy is isolated in the various inlet pipes 100 and laminar flow is induced.

Clarifier inlet pipes 100 are disposed adjacent clarifier first end wall 22. Flow from clarifier inlet pipes 100 is directed in the direction indicated by arrows 108. Such flow is uniform, laminar flow.

Referring to FIG. 1, a sludge return header 112 is disposed in clarifier 14 near the bottom of the clarifier 14. Sludge return header 112 is spaced from partition 18 and from foundation 56. Referring to FIG. 3, header 112 extends at a first end 162 into mixing chamber 16 where it is connected to a flow-control valve 164. The inlet to flow control valve 164 is open, receiving liquid contained within mixing chamber 16. Flow through control valve 164 is accomplished by valve control stem 166 and rod 168 extending from control stem 166 above the liquid level in mixing chamber 16.

A plurality of sludge suction pipes 114 are connected to sludge header 112. Suction pipes 114 are spaced throughout the clarifier 14 and are spaced from the foundation 56 but near the bottom of the clarifier 14. In the preferred embodiment, the suction pipes 114 are spaced at uniform radial intervals, the segregation of suction pipes 114 depending on plant characteristics.

Referring to FIG. 2, each of sludge suction pipes 114 contains a sludge control valve 116 in said suction pipe 114 near its connection with said sludge header 112. Each of sludge suction pipes 114 is provided with a plurality of apertures 118. Apertures 118 are provided on the underside of sludge pipes 114. A closed end 120 is provided in each sludge inlet pipe 114 distal from the sludge header 112. Sludge suction pipes 114 are in fluid communication with sludge header 112. Flow control valves 116 are provided on sludge suction pipes 114 between header 114 and the apertures 118. The flow control valves 116 are individually adjustable to independently control flow from each of the suction pipes 114 into sludge header 112. A valve control stem 117 is provided on each valve 116. The valve control stem 117 is connected to a control rod 122 extending from the valve stem 117 upwardly above the level of liquor contained in clarifier 14.

Referring to FIG. 2, an access walkway 124 is provided around the circumference of the aeration basin 12, said access walkway 124 extending above and outwardly from partition 18. Control rod 122 is accessible from access walkway 124 for operation of sludge control valve 116. Each sludge control valve 116 is separately operable by a separate control rod 122.

Referring to FIGS. 1 and 3, end 170 of sludge header 112 extends into mixing chamber 16. End 170 is fluidly connected through pipe elbow 172 to the inlet 35 of pump 34. Pump 34 draws mixed liquor from sludge header 112, which mixed liquor includes wastewater drawn through valve 164 from mixing chamber 16 and settled sludge from the clarifier 14. Pump 34 pumps the mixed liquor into aeration basin 12 through manifold 26 and aerators 28, 30 and 32.

A second flow control valve 128 is disposed in mixing chamber 16. Valve 128 includes an open end 129 extending into mixing chamber 16. The distal end of valve 128 is connected to a pipe 127 extending through partition 18 into aeration basin 12. Valve 128 controls flow of liquor from the aeration basin 112 into mixing chamber 16. A control rod 131 extends above the liquor level of chamber 16 from the balancing valve. Control rod 131 is accessible from the walkway 124 to provide manual control of valve 128.

Referring to FIG. 5, a cross-sectional view of a submerged discharge orifice weir 130 of the present invention is depicted. Weir 130 is disposed in clarifier 14 near mixing chamber 16. Weir 130 comprises a generally U-shaped trough 132 including a trough base 134, trough sidewalls 136 and 138 and trough end walls 140 and 142. Referring to FIG. 2, trough 132 is disposed in the clarifier 14 with base 134 below the upper surface of the liquor contained within clarifier 114 and sidewalls 136 and 138 and end walls 140 and 142 extending above the surface of the liquor contained in clarifier 14. A plurality of orifices 144 are provided in the base 134, the said orifices 144 allowing flow into the trough 132. Clarified liquid discharge pipe 146 is connected to trough base 134 at one end with the distal end extending outside the clarifier 14. Clarified liquid discharge pipe 146 transmits clarified liquid received in weir 130 to another location (not shown) for chlorination.

Referring to FIG. 1, scum baffles 150 are provided in clarifier 14. The scum baffles are located at the surface of liquid contained within clarifier 14. A scum port 152 is provided in partition 18 adjacent each scum baffle 150. Each scum baffle 150 is attached at one end to the outer wall 20 and at a distal end to the partition 18. Each scum baffle 150 is connected at the outer wall 20 upstream (in relation to the direction of flow 108 of the clarifier 14) from the connection of the member 150 to the partition 18. Each scum baffle 150 extends below the liquid surface and above the liquid surface.

Referring to FIG. 4, details of a typical scum port 152 are depicted. Each scum port 152 comprises an opening 154 provided in partition 18 just upstream of the connection of scum baffle 150 to partition 18. A plate 156 is attached to partition 18 at hinge 155, said plate 156 being angularly adjustable to control flow through the opening 154. Adjustment rod 157 allows for fixed angular adjustment of plate 156. Plate 156 is attached to the partition 18 upstream of opening 154 and opens inwardly thereby allowing flow from clarifier 14 into aeration basin 12. Scum baffle 150, opening 154, and plate 156 co-act to divert surface scum from clarifier 14 through opening 154 into aeration basin 12.

OPERATION

Recirculating flow in the wastewater treatment system 10 is accomplished by hydraulic head pressure induced by pump 34 and the structure and arrangement of the various components described herein. Raw wastewater is input into the wastewater treatment system 10 through inlet pipe 38 and bar screen 36, bar screen 36 removing large objects from the raw wastewater. The raw wastewater is introduced into mixing chamber 16 where it is mixed, when desired, with liquor from aeration basin 12. Liquor from aeration basin 12 flows into mixing chamber 16 through valve 128, the liquor flow being controlled by valve 128.

Liquor contained within mixing chamber 16 is drawn through valve 164 into sludge header 112. Liquor including suspended organic solids settling to the bottom of clarifier 14 is also drawn into sludge header 117 through apertures 118 and sludge suction pipes 116. The mixture is drawn into pipe inlet 35 and pumped into mixed liquor manifold 26.

The mixed liquor, comprising raw wastewater, return sludge from sludge header 112 and liquor from aeration basin 12 is pumped into aeration basin 12 through manifold 26 and aerators 28, 30, and 32.

Aerators 28, 30, and 32 are directed inwardly from the peripheral partition 18 of aeration basin 12. Air is entrained in the mixed liquor at each of aerators 28, 30, and 32. The relatively high velocity of flow through aerators 28, 30, and 32 create fine, dispersed air bubbles in turbulent flow, entraining air in the mixed liquor. The mixed liquor rotates in the aeration basin in the direction indicated by arrows 40, the air bubbles imparted through aerators 28, 30, and 32 imparting upward motion to the mixture.

Radially, the flow is turbulent at the discharge of the aerators 28, 30 and 32 and relatively calmer towards the center of the aeration basin thereby allowing heavier suspended organic solids to accumulate in the center of the aeration basin. Three aerators 28, 30 and 32 are depicted in the preferred embodiment. The number, size, shape and orientation of aerators may be varied to optimize oxygen entrainment in the liquid and velocity of liquid flow in the aeration basin 12. Rotational flow of liquid is facilitated by energy input from the aerators 28, 30 and 32 spaced around the periphery of the aeration basin 12. The turbulent, rotational flow maintains a homogeneous liquid mixture in the area of turbulent flow within oxidation basin 12. In the preferred embodiment, oxygen is maintained at a minimum of 2.4 parts per million (ppm) in the area of turbulent flow. In the center of the aeration basin 12 where excess activated sludge accumulates and in the drain pipe 58, the dissolved oxygen falls to 2.0 ppm.

A quantity of the mixed liquor flows through clarifier inlet pipes 100 into clarifier 14, the slots 106 provided in clarifier inlet pipes 100 establishing laminar flow in the clarifier 14. The relatively calm laminar flow in clarifier 14 allows suspended organic solids contained in the mixed liquor to settle out of the mixed liquor. Scum baffles 150 and scum ports 152 co-act to divert surface scum from the surface of mixed liquor contained within clarifier 14 into the aeration basin 12.

The plurality of sludge suction pipes 114 connected to sludge header 112 in clarifier 14 allow settled sludge to be drawn into sludge header 112.

The plurality of sludge suction pipes 114 allow return time of sludge from the clarifier 14 to aeration basin 12 to be independently varied according to the desired retention time of the sludge within clarifier 14. This allows the age of returned sludge to be varied independent of system throughput.

The clarified liquid passing circumferentially through clarifier 14 is received in orifice weir 130, subsurface clarified liquid being received in orifices 144 and discharged from the clarifier 14 through discharge line 146.

Valve 128 and the plurality of valves 116 allow the relative proportions of (i) clarifier 14 return sludge, (ii) aeration basin 12 liquid and (iii) raw wastewater in the mixed liquor introduced in the aeration basin 12 to be varied as desired.

Excess sludge, containing relatively heavier suspended organic solids, accumulates in the relatively less turbulent central area of aeration basin 12 for thickening and substantial digestion of excess volatile s. The accumulation of waste sludge at the center of the aeration basin 12 provides for aeration as appropriate for the sludge independent of system throughput. From time to time sludge accumulated in the center of the aeration basin may be discharged through drain 54 into discharge pipe 58 by operation of valve 60.

Fluid flow throughout the aeration basin (12) clarifier (14) and mixing chamber (16) is induced by a single pump or pump unit provided in the mixing chamber 16. The pump suction pressure within sludge header 112 draws liquid from clarifier 14 and mixing chamber 16. The pump head pressure induces flow into aeration basin 12.

It will be further noted that the wastewater treatment system 10 of the present invention provides for a relatively concurrent mixture of the raw wastewater and return sludge with air for oxidation.

The wastewater system 10 of the present invention, due to the plurality of sludge inlet pipes 114 and spaced relationship of sludge inlet pipes 114 in clarifier channel 14 allow the operator to vary the return sludge age independent of sludge return rate. The ability to vary sludge age independent of sludge return rate allows the wastewater treatment system 10 to operate at relatively low wastewater loadings (as compared to design capacity) without occurrence of denitrification experienced in conventional systems operating with high sludge age.

The design parameters for volume of surface area of the aeration basin 12 and clarifier 14 are based on influent characteristics of the wastewater to be treated. The continuous-flow of the wastewater system 10 of the present invention and the ability to vary return sludge age independent of sludge return rate and independent of plant throughput allow some variation in comparative size and volume of the wastewater treatment system 10 in relation to volume of wastewater treated.

The mass balance for the microbial mass within the wastewater treatment system 10 is determined by microorganism flow into the system boundary less microorganism flow out of the system plus net microorganism growth within the system boundary. Excess activated sludge must be removed from the wastewater system 10 to maintain desired balance of wastewater suspended organic solids to microbes. It is therefore necessary to remove excess activated sludge from the system 10 on a regular basis. Such removal is readily accomplished in the present wastewater system 10 due to the accumulation of excess activated sludge in the center of aeration basin 12, greatly simplifying an important control variable. The operator need only to remove digested sludge periodically through valve 54 and pipe 58 to maintain such process equilibrium.

Since sludge return from the clarifier 14 is continuous, the only regularly required monitoring by the operator is a 30-minute settleability test to insure the proper ratio of mixed liquor to suspended organic solids within the aeration basin.

The wastewater treatment system 10 produces consistent digested sludge through a relatively wide range of flow rates with a single test reference. Wasted sludge is approximately $2\frac{1}{2}\%$ to 3% organic solids with a mean sludge age of more than thirty days. Such sludge is relatively inert and free of pathogens.

The wastewater treatment system 10 of the present invention effectively processes a wider range of wastewater hydraulic peaks than conventional wastewater treatment systems. Conventional system designs allow for a two-hour hydraulic peak of two to three times the design daily average flow. The present wastewater treatment system 10 effectively processes two-hour hydraulic peaks of up to 12 times design daily average flow. The volumetric loading of the wastewater treatment system 10 can vary from 15 lbs. BOD per 1000 cubic feet to 120 lbs. BOD per 1000 cubic feet. Conventional designs allow for a range of 15 to 35 lbs. BOD per 1000 cubic feet for municipal applications. The present wastewater system 10 is therefore capable of effectively treating higher concentrations of organisms in wastewater and can be particularly effective in developing countries where pollution levels are much higher.

The design of the present wastewater system 10 greatly reduces the maintenance required of the wastewater system 10 in relation to current technology due to the reduction of electro-mechanical subsystems to a single pump or pump unit.

The ability to control sludge age independent of sludge return rate and plant throughput and to control extended sludge aeration periods independent of plant throughput allow the operator a wide variety of treatment options.

The wastewater treatment system 10 has been depicted and described in terms of a preferred embodiment including circular aeration basin 12 and circumferentially-extending clarifier 14. It will be obvious to one skilled in the art that rotational flow may be induced in a basin comprising other than a circle. For example, the aeration basin 10 may be polygonal. A hexagon configuration would allow for clustering of wastewater systems, such wastewater systems having the capability of having contiguous exterior walls and potentially reducing construction costs and space requirements.

It will be obvious to one skilled in the art that improved aeration basin 12 may be operated independently of the disclosed clarifier 14 as an improved primary treatment system connected by conventional piping arrangements to conventional settling tanks, sludge digesting tanks, and so forth, such arrangement including return sludge from a settling tank or sludge digestion tank for creating a mixed liquor including return sludge and raw wastewater.

It will be obvious to one skilled in the art that improved clarifier 14 may be operated independently of the disclosed aeration basin 12 connected by conventional piping arrangements to conventional aeration tanks, sludge digestion tanks and so forth, clarifier 14 providing improved process control by allowing control of sludge age independent of plant throughput.

While the present invention has been described with respect to particular embodiments of apparatus and methods, it will be appreciated that various modifications and adaptations may be made based on the present disclosure and are intended to be within the scope of the accompanying claims.

I claim:

1. A wastewater treatment system comprising in combination:
   an aeration basin;
   a pump having a pump inlet and a pump outlet;
   at least one mixed liquor inlet disposed in said basin near the periphery of said basin, said mixed liquor inlet having a discharge outlet oriented tangentially to the periphery of said basin;
   said pump outlet in fluid communication with said mixed liquor inlet for inducing flow of wastewater through said mixed liquor inlet;
   an air inlet in fluid communication with said mixed liquor inlet;
   a mixed liquor outlet provided in said basin, said mixed liquor outlet in fluid communication with said pump inlet;
   an untreated wastewater inlet in fluid communication with said pump inlet;
   said pump providing means for inducing continuous circulation of mixed liquor through said mixed liquor inlet, said aeration basin and said mixed liquor outlet;
   said mixed liquor inlet providing means for inducing turbulent, rotational flow of aerated mixed liquor in a first area near the periphery of said basin and less-turbulent flow in a second area central of said basin whereby wastewater organic solids accumulate in said second area; and
   an organic solids outlet in the floor of said basin at said second area.

2. A wastewater treatment system according to claim 1 wherein
   said mixed liquor inlet includes an inlet pipe in fluid connection with said pump outlet;
   said inlet pipe including a reduced-diameter nozzle;
   said air inlet in fluid communication with said mixed liquor inlet downstream of said reduced-diameter nozzle;
   whereby velocity of flow through said reduced-diameter nozzle induces reduced pressure downstream of said reduced-diameter nozzle results in induction of air into said mixed liquor inlet and turbulent mixing of said air with said mixed liquor.

3. A wastewater treatment system according to claim 2 wherein
   said mixed liquor inlet including a housing external of said inlet pipe said housing including a discharge aperture, said discharge aperture oriented tangentially to the periphery of said basin.

4. A wastewater treatment system according to claim 1 wherein
   a plurality of mixed liquor inlets are provided in spaced relationship around the periphery of said basin;
   the discharge apertures of said mixed liquor inlets oriented in like angular direction;
   said mixed liquor inlets providing means for producing consistently turbulent, rotational flow in said first area.

5. A wastewater treatment system according to claim 1 further comprising
   a mixing chamber in fluid communication with said mixed liquor outlet and in fluid communication with said untreated wastewater inlet;
   a flow control valve provided on said mixed liquor outlet;
   whereby relative composition of untreated wastewater and previously-aerated wastewater in the mixed liquor may be adjusted.

6. A wastewater treatment system according to claim 1 wherein said aeration basin is generally circular.

7. A wastewater treatment system comprising in combination:
   an aeration basin for receiving a mixed liquor of previously-aerated wastewater and untreated wastewater;
   a clarifier;
   a pump having a pump inlet and a pump outlet;
   at least one mixed liquor inlet disposed in said basin oriented tangentially to the periphery of the basin;

said pump outlet in fluid communication with said mixed liquor inlet for inducing flow of mixed liquor through said mixed liquor inlet;

said pump and said mixed liquor inlet providing means for inducing turbulent, rotational flow of mixed liquor in a first area of said basin and less-turbulent mixed liquor flow in a second area central of said basin whereby aerated suspended organic solids settle in said second area;

an organic solids outlet located in said second area;

an untreated wastewater inlet in fluid communication with said pump inlet;

said clarifier comprising a channel in fluid communication with said aeration basin at a first end of said clarifier channel;

a clarified liquor outlet at a second end of said channel;

means establishing fluid communication between said pump inlet and mixed liquor contained in said clarifier channel;

whereby said pump induces continuous circulation of mixed liquor through said aeration basin and said clarifier channel.

8. A wastewater treatment system according to claim 7 wherein said mixed liquor inlet includes an inlet pipe in fluid connection with said pump outlet;

said inlet pipe including a reduced-diameter nozzle;

said air inlet in fluid communication with said mixed liquor inlet downstream of said reduced-diameter nozzle;

whereby velocity of flow through said reduced-diameter nozzle induces reduced pressure downstream of said reduced-diameter nozzle resulting in induction of air into said mixed liquor inlet and turbulent mixing of said air with said mixed liquor; and said mixed liquor inlet including a housing external of said inlet pipe said housing having a discharge aperture, said discharge aperture oriented tangentially to the periphery of said basin.

9. A wastewater treatment system according to claim 8 wherein a plurality of mixed liquor inlets are provided in spaced relationship around the periphery of the basin;

the discharge apertures of said inlets oriented in like angular direction;

said mixed liquor inlets providing means for producing consistently turbulent, rotational flow in said first area.

10. A wastewater treatment system according to claim 7 wherein said clarifier channel is contiguous with the periphery of the aeration basin.

11. A wastewater treatment system according to claim 10 wherein said aeration basin is generally circular.

12. A wastewater treatment system according to claim 7 wherein said clarifier includes:

a sludge header disposed along the length of the channel;

a plurality of spaced sludge suction arms in fluid communication with said sludge header;

each of said sludge suction arms near the bottom of said channel;

said sludge header in fluid communication with suction means;

whereby mixed liquor is introduced into said channel at said first end, settled organic solids are removed from said clarifier channel through said suction arms and said suction header, and clarified liquor is removed from said channel through said clarified liquor outlet.

13. A wastewater treatment system according to claim 12 wherein a valve is provided on each suction arm controlling flow through the suction arm to the sludge header.

14. A wastewater treatment system according to claim 7 wherein fluid communication between said aeration basin and said clarifier channel first end is accomplished by at least one pipe, said pipe having a first end disposed in said aeration basin; said pipe having a pipe segment extending into said clarifier channel; said pipe having a second end disposed in said clarifier channel; said pipe being open at its first end and at its second end, and said pipe segment having a laterally-extending slot.

15. A wastewater treatment system according to claim 14 wherein a plurality of pipes are provided.

16. A wastewater treatment system according to claim 7 wherein scum baffle means are provided in the clarifier channel, said scum baffle means including a baffle extending transversely across said channel, said scum baffle diverting surface scum to an opening in a channel wall, said channel wall opening in fluid communication with said aeration basin whereby surface scum is diverted from the clarifier channel to the aeration basin.

17. A method for treatment of wastewater to reduce organic solids contents, reduce biological oxygen demand and separate clarified liquid from sludge, said method comprising the steps of:

mixing wastewater to be treated with previously-aerated wastewater to create a mixed liquor, said previously-aerated wastewater containing organic solids including bacteria, protozoa and other microorganisms;

aerating said mixed liquor;

inducing turbulent flow of said aerated mixed liquor in a first peripheral area of a basin;

providing an area of reduced turbulence of flow in a second central area of said basin to allow settling of organic solids from the aerated mixed liquor;

intermittently removing accumulated organic solids from said second area;

segregating a first flow of aerated mixed liquor;

inducing laminar flow of said first flow in a channel to allow settling of organic solids from said first flow;

removing settled organic solids from said channel; and utilizing said removed organic solids for mixing with said wastewater to be treated; and removing clarified liquor from said channel.

18. The method according to claim 17 wherein said mixing of wastewater to be treated with previously-aerated wastewater includes pumping the wastewater to be treated and the previously-treated wastewater through a common header.

19. The method according to claim 17 wherein aerating said mixed liquor includes inducing mixed liquor flow through at least one reduced-diameter nozzle and providing fluid communication of air with the mixed liquor at the nozzle outlet.

20. The method according to claim 17 wherein inducing turbulent flow of said aerated mixed liquor in a basin includes inducing flow of said aerated mixed liquor through at least one reduced-diameter nozzle.

21. The method according to claim 17 wherein said basin is generally circular.

22. The method of claim 17 further comprising the steps of:
   introducing said first flow into a first end of said channel;
   removing settled organic solids from at least one of a plurality of locations along said channel;
   removing said clarified liquor from a second distal end of said channel;
   whereby said settled organic solids may be removed from said channel independently of flow quantity of aerated mixed liquor.

23. The method of claim 17 further comprising the steps of:
   introducing said first flow into a first end of said channel;
   removing settled organic solids from at least one of a plurality of locations along said channel;
   removing said clarified liquor from a second distal end of said channel;
   whereby settled organic solids may be removed from said channel from a plurality of locations.

24. The method of claim 17 further comprising the step of:
   providing continuous fluid communication between said basin and said channel and inducing fluid flow between said basin and said channel with a single pump.

* * * * *